United States Patent
Gulari et al.

(10) Patent No.: US 7,157,517 B2
(45) Date of Patent: Jan. 2, 2007

(54) METHOD OF DELAMINATING A GRAPHITE STRUCTURE WITH A COATING AGENT IN A SUPERCRITICAL FLUID

(75) Inventors: Esin Gulari, Detroit, MI (US); Gulay K. Serhatkulu, Taylor, MI (US)

(73) Assignee: Wayne State University, Detroit, MI (US)

( * ) Notice: Subject to any disclaimer, the term of this patent is extended or adjusted under 35 U.S.C. 154(b) by 372 days.

(21) Appl. No.: 10/620,832

(22) Filed: Jul. 16, 2003

(65) Prior Publication Data

US 2005/0014867 A1 Jan. 20, 2005

(51) Int. Cl.
| | |
|---|---|
| *C08K 3/04* | (2006.01) |
| *C08K 3/26* | (2006.01) |
| *C08K 5/01* | (2006.01) |
| *B60C 1/00* | (2006.01) |

(52) U.S. Cl. ............ 524/494; 524/424; 524/428; 524/474; 524/495; 523/215; 523/216; 252/378 R; 125/23.01; 106/475

(58) Field of Classification Search ............... 524/424, 524/428, 474, 495; 523/216, 215; 252/378 R; 125/23.01; 106/475

See application file for complete search history.

(56) References Cited

U.S. PATENT DOCUMENTS

| | | | |
|---|---|---|---|
| 4,946,892 | A | 8/1990 | Chung |
| 6,469,073 | B1 | 10/2002 | Manke et al. |
| 2002/0006511 | A1* | 1/2002 | Clere ............... 428/404 |
| 2002/0054995 | A1 | 5/2002 | Mazurkiewicz |
| 2002/0082331 | A1 | 6/2002 | Mielewski et al. |
| 2004/0033189 | A1 | 2/2004 | Kaschak et al. |
| 2004/0034151 | A1 | 2/2004 | Kaschak et al. |
| 2004/0106720 | A1 | 6/2004 | Jerome et al. |
| 2005/0014867 | A1 | 1/2005 | Gulari et al. |

FOREIGN PATENT DOCUMENTS

| | | |
|---|---|---|
| DE | 198 21 477 A1 | 11/1999 |
| DE | 100 36 336 A1 | 2/2002 |
| EP | 1 247 829 A1 | 10/2002 |
| WO | WO 98/09926 | 3/1998 |

OTHER PUBLICATIONS

Article from *Journal of Materials Chemistry*, by Andrew I Cooper, titled: "Polymer Synthesis and Processing Using Supercritical Carbon Dioxide," dated: Sep. 29, 1999, pp. 207-234.

Gulay K. Serhatkulu, et al., "A New Approach to Polymer Nanocomposites with Supercritical C02 Exfoliated Clays," Nov. 2002, https://engineering.purdue.edu/Che/Nano/NanoChmE/NSE_Topical_2002/SynthesisandProcessingofNanocompositesAbstracts.htm.

Qian Zhao, et al., "Supercritical $CO_2$-Mediated Intercalation of PEO in Clay," Jul. 9, 2003 (revised Aug. 1, 2003), Macromolecules, vol. 36, No. 19, pp. 6967-6969.

Tomas Berglof, et al., "Metsulfuron Methyl Sorption—Desorption in Field-Moist Soils," May 2, 2003, J. Agric. Food Chem., vol. 51, No. 12, pp. 3598-3603.

M. L. Occelli, et al., "Surface Area, Pore Volume Distributio, and Acidity in Mesoporous Expanded Clay Catalysts from Hybrid Density Functional Theory (DFT) and Adsorption Microcalorimetry Methods," Jun. 20, 2002 (final form Sep. 11, 2002), Langmuir, vol. 18, No. 25, pp. 9816-9823.

Ryo Ishii, et al., "A Comparison of Supercritical Carbon Dioxide and Organic Solvents for the Intercalation of 4-Phenylazoaniline into a Pillared Clay Mineral," Apr. 26, 2002 (accepted Jul. 22, 2002), Journal of Colloid and Interface Science 254, pp. 250-256.

Masami Okamoto, et al., "Biaxial Flow-Induced Alignment of Silicate Layers in Polypropylene/Clay Nanocomposite Foam," Jun. 27, 2001 (revised Jul. 17, 2001), Nano Lett., vol. 1, No. 9, pp. 503-505.

Z. Ding, et al., "Characterization of Pore Structure and Coordination of Titanium in $TiO_2$ and $SiO_2$—$TiO_2$ Sol-Pillared Clays," Aug. 29, 2000 (accepted Feb. 27, 2001), Journal of Colloid and Interface Science 238, pp. 267-272.

Walter Fiddler, et al., "Potential Artifact Formation of Dioxins in Ball Clay During Supercritical Fluid Extraction," Apr. 25, 2000 (accepted Aug. 1, 2000), Journal of Chromatography A, 902, pp. 427-432.

Gerson L. V. Coelho, et al., "Description of Ethyl Acetate from Adsorbent Surfaces (Organoclays) by Supercritical Carbon Dioxide," Published on Web Nov. 10, 2000, Ind. Eng. Chem. Res., vol. 40, No. 1, pp. 364-368.

L. Morselli, et al., "Supercritical Fluid Extraction for the Determination of Petroleum Hydrocarbons in Soil," © 1999, Journal of Chromatography A, 845, pp. 357-363.

A. C. Pierre, et al., DLVO Theory and Clay Aggregate Architectures Formed with $AlCl_3$, Sep. 17, 1998 (accepted Oct. 26, 1998), Journal of the European Ceramic Society 19, pp. 1615-1622.

(Continued)

*Primary Examiner*—Kriellion Sanders
(74) *Attorney, Agent, or Firm*—Brinks Hofer Gilson & Lione

(57) ABSTRACT

The present invention involves a method of delaminating a graphite structure. The method comprises diffusing a coating agent in a supercritical fluid between layered particles of a graphite structure defining contacted graphite particles and catastrophically depressurizing the supercritical fluid to form delaminated graphite particles.

14 Claims, 4 Drawing Sheets

OTHER PUBLICATIONS

Lionel Spack, et al., "Comparison of Supercritical Fluid Extraction (SFE), Soxhlet and Shaking Methods for Pendimethalin Extraction From Soils: Effect of Soil Properties and Water Content," © 1998, Journal of Contaminant Hydrology 33, pp. 171-185.

Shijiang Liang, et al., "Extraction of Petroleum Hydrocarbons from Soil Using Supercritical Argon," Feb. 1, 1998, Analytical Chemistry, vol. 70, No. 3, pp. 616-622.

R. Montero-Vazquez, et al., "Kinetics of the Extraction of Pyrene Using Carbon Dioxide in Dense Phase," Feb. 20, 2002, (© 2003), Chemosphere 53, pp. 789-793.

Mihaela Popovici, et al., "Ultraporous Single Phase Iron Oxide-Silica Nanostructured Aerogels from Ferrous Precursors," Jun. 19, 2003 (published 2004), Langmuir, vol. 20, No. 4, pp. 425-1429.

Brady J. Clapsaddle, et al., "Silicon Oxide in an Iron (III) Oxide Matrix: The Sol-Gel Synthesis and Characterization of Fe—Si mixed Oxide Nanocomposites that Contain Iron Oxide As the Major Phase," Apr. 9, 2003 (© 2003), Journal of Non-Crystalline Solids, vol. 331, pp. 190-201.

Youhei Fujimoto, et al., "Well-Controlled Biodegradable Nanocomposite Foams: From Microcellular to Nanocellular," 2003, Macromolecular Rapid Communications, vol. 24, pp. 457-461.

Azusa Kameo, et al., "Preparation of Noble Metal Nanoparticles in Supercritical Carbon Dioxide," Jul. 2, 2002 (accepted Sep. 26, 2002), Colloids and Surfaces A: Physicochem. Eng. Aspects, vol. 215, pp. 181-189.

Adam Zerda, et al., "Highly Concentrated, Intercalated Silicate Nanocomposites: Synthesis and Characterization," Aug. 19, 2002 (published Feb. 11, 2003), Macromolecules, vol. 36, pp. 1603-1608.

Jianxin Zhang, et al., "Preparation of a Poly (Methyl Methacrylate)/Ultrahigh Molecular Weight Polyethylene Blend Using Supercritical Carbon Dioxide and the Identification of a Three-Phase Structure: An Atomic Force Microscopy Study," Dec. 28, 2001 (published Oct. 5, 2002), Macromolecules, vol. 35, pp. 8869-8877.

Maria F. Casula, et al., "FeCo—$SiO_2$ Nanocomposite Aerogels by High Temperature Supercritical Drying," Mar. 28, 2002 (accepted Feb. 26, 2002), Journal of Materials Chemistry, vol. 12, pp. 1505-1510.

Li. Casas, et al., "Silica Aerogel-Iron Oxide Nanocomposites: Structural and Magnetic Properties," 2001, Journal of Non-Crystalline Solids, vol. 285, pp. 37-43.

Catherine A. Morris, "Modifying Nanoscale Silica With Itself: A Method to Control Surface Properties of Silica Aerogels Independently of Bulk Structure," 2001, Journal of Non-Crystalline Solids, vol. 285, pp. 29-36.

Ken Johns, "Superficial Fluids—A Novel Approach to Magnetic Media Production?," © 1999, Tribology International, vol. 31, No. 9, pp. 485-490.

James J. Watkins, et al., "Polymer/Metal Nanocomposite Synthesis in Supercritical $CO_2$," Jul. 10, 1995 (received Sep. 27, 1995), Chemistry of Materials, vol. 7, No. 11, pp. 1991-1994.

R. Montero-Vazquez, et al., "Kinetics of the Extraction of Pyrene Using Carbon Dioxide in Dense Phase," May 2, 2003 (accepted May 13, 2003), Chemosphere, vol. 53, pp. 789-793.

Valeriy V. Ginzburg, et al., "Theoretical Phase Diagrams of Polymer/Clay Composites: The Role of Grafted Organic Modifiers," Aug. 9, 1989 (received Nov. 3, 1999), Macromolecules, vol. 33, No. 3, pp. 1089-1099.

K. Takahama et al., "Supercritical drying of $SiO_2$-$TiO_2$ sol-pillared clays," 1992, Journal of Materials Science 27, pp. 1297-1301.

Manuel Garcia-Leiner et al., "Processing of Intractable Polymers Using High-Pressure Carbon Dioxide," 2003, ANTEC, pp. 1610-1614.

Manuel Garcia-Leiner et al., "A Study of the Foaming Process of Polyethylene with High Pressure $CO_2$ in a Modified Extrusion System."

Manuel Garcia-Leiner et al., "Drawing of UHMWPE Fibers in the Presence of Supercritical $CO_2$."

Xiangmin Han et al., "Extrusion of Polystyrene Nanocomposite Foams with Supercritical $CO_2$," Jun. 2003, Polymer Engineering and Science, vol. 43, No. 6, pp. 1261-1275.

* cited by examiner

METHOD OF DELAMINATING A GRAPHITE STRUCTURE WITH A COATING AGENT IN A SUPERCRITICAL FLUID

FIELD OF THE INVENTION

The present invention relates to delaminated graphite structures. More particularly, the invention relates to a method of delaminating a graphite structure. The delaminated graphite structures are useful for mixing with a polymer to produce a reinforced polymer having improved chemical, mechanical, electrical, and fire retardancy properties.

BACKGROUND OF THE INVENTION

The use of plastics in various industries is steadily increasing due to their light weight and continual improvements to their properties. For example, in the automotive industry, polymer-based materials may comprise a significant portion, e.g., at least 15 percent, of a given vehicle's weight. These materials are used in various automotive components, such as, interior and exterior trim and side panels. As the industry seeks to improve fuel economy, more steel and aluminum parts may be targeted for replacement by polymer-based materials. In addition, improvements in the mechanical properties of polymers are necessary in order to meet more stringent performance requirements. Such mechanical properties include, for example, stiffness, dimensional stability, modulus, heat deflection temperature, barrier properties, and rust and dent resistance. Improved mechanical properties may reduce manufacturing costs by reducing the part thickness and weight of the manufactured part and the manufacturing time thereof.

There are a number of ways to improve the properties of a polymer, including reinforcement with particulate fillers or glass fibers. Currently, it is known that polymers reinforced with nanometer-sized platelets or particles of layered silicates or clay can significantly improve the mechanical properties at much lower loading than conventional fillers. (See, for example, U.S. Pat. No. 6,469,073 issued to Manke et al. (2002) and U.S. Patent Application Publication No. US 2002/0082331 A1 to Mielewski et al. (2002).) This type of composite is termed a "nanocomposite." More specifically, polymer-silicate nanocomposites are compositions in which nano-sized particles of a layered silicate, e.g., montmorillonite clay, are dispersed into a thermoplastic or a thermoset matrix. The improvement in mechanical properties of nanocomposites is believed to be due to factors such as the increased surface area of the particles.

However, in the development of polymer-silicate nanocomposites, structures yielding the best fire retardancy frequently produce unacceptable mechanical properties. Another problem with the polymer-silicate nanocomposites is the thermal instability of the organic ions introduced between the layers. That is, although polymer-silicate nanocomposites have been shown to exhibit a significant increase in thermal stability, they sometimes thermally decompose within a host polymer. (See, for example, J. Zhu, F. M. Uhl, A. B. Morgan, C. A. Wilkie, *Chem. Mater.*, 13, 4649–4654 (2001).)

Thus, in recent years increasing attention has been devoted to developing polymer-graphite composites for applications where electrical conductivity or thermal conductivity enhancement is desired. Graphite, which like clay also has a layered structure, has proven to be a candidate for replacement of clays. Graphite, a refractory material, can provide excellent fire retardancy for polymers. Graphite nanocomposites also include the char formation, which is an additional advantage for fire retardancy. In addition to high electrical conductivities, polymer-graphite composites often possess other desirable properties, such as corrosion resistance, low cost and ease of processing. Given this combination of properties, polymer-graphite composites present an attractive alternative to metal conductors in certain applications.

However, challenges to developing such composites exist. That is, although several kinds of graphite intercalation compounds have been synthesized, only a few graphite-polymer nanocomposites have been reported because organic molecules are hard to directly intercalate into graphite. Moreover, current methods have proven to be timely and costly.

Current processes to prepare exfoliated or intercalated graphite involve relatively undesirable solvents and extreme conditions. For example, in one process, an artificial graphite is prepared by introducing sulfuric acid into the graphite interlayers and rapidly heating the graphite at temperatures of between 800° C. and 1,000° C. (See, for example, U.S. Pat. No. 5,482,798, issued to Mototani et al. (1996).) Graphite can be intercalated by exposure to an appropriate chemical reagent, known as the intercalate, which enters between the carbon layers of the graphite. The resulting material known as intercalated graphite layers comprising carbon are stacked on top of one another in a periodic fashion. Heating intercalated graphite layers to a sufficiently high temperature causes exfoliation, which is a sudden increase in the dimension perpendicular to the carbon layers of the intercalated graphite, forming vermicular or wormlike shapes. (See, for example, U.S. Pat. No. 4,946,892 issued to Chung (1990).) Thus, there remains a need for new methods for forming polymer graphite composites.

BRIEF SUMMARY OF THE INVENTION

The present invention generally provides a system and method of delaminating a graphite structure with a coating agent solubilized in a supercritical fluid. The graphite structure may be implemented to reinforce materials such as polymers for enhanced mechanical, electrical, chemical, and fire retardancy properties of the polymer.

In one embodiment, the method comprises diffusing a coating agent in a supercritical fluid between layered particles of a graphite structure. The method further comprises catastrophically depressurizing the supercritical fluid to form delaminated graphite particles.

In another embodiment, the present invention includes a method of preparing graphite-polymer nanocomposites. The method comprises diffusing layered graphite particles having covalent bonds with a coating agent solubilized in a supercritical fluid to intercalate the coating agent between the layered graphite particles having covalent bonds defining contacted graphite particles. The method further comprises catastrophically depressurizing the contacted graphite particles having covalent bonds to exfoliate the contacted graphite particles and reduce reformation of covalent bonds therebetween. The coating agent is precipitated from the supercritical fluid and deposited on the contacted graphite particles during depressurization, defining delaminated graphite particles. The method further comprises mixing the delaminated graphite particles with a polymer to form graphite-polymer nanocomposites.

In still another embodiment, the present invention includes a delaminated graphite structure comprising exfoliated layered graphite particles coated with a coating agent and substantially singly disbursed apart from each other.

In another embodiment, the present invention includes a graphite-polymer nanocomposite comprising delaminated graphite particles coated with a coating agent and dispersed in a polymer.

Further aspects, features, and advantages of the invention will become apparent from consideration of the following description and the appended claims when taken in connection with the accompanying drawings.

DETAILED DESCRIPTION OF THE INVENTION

Figure 1:
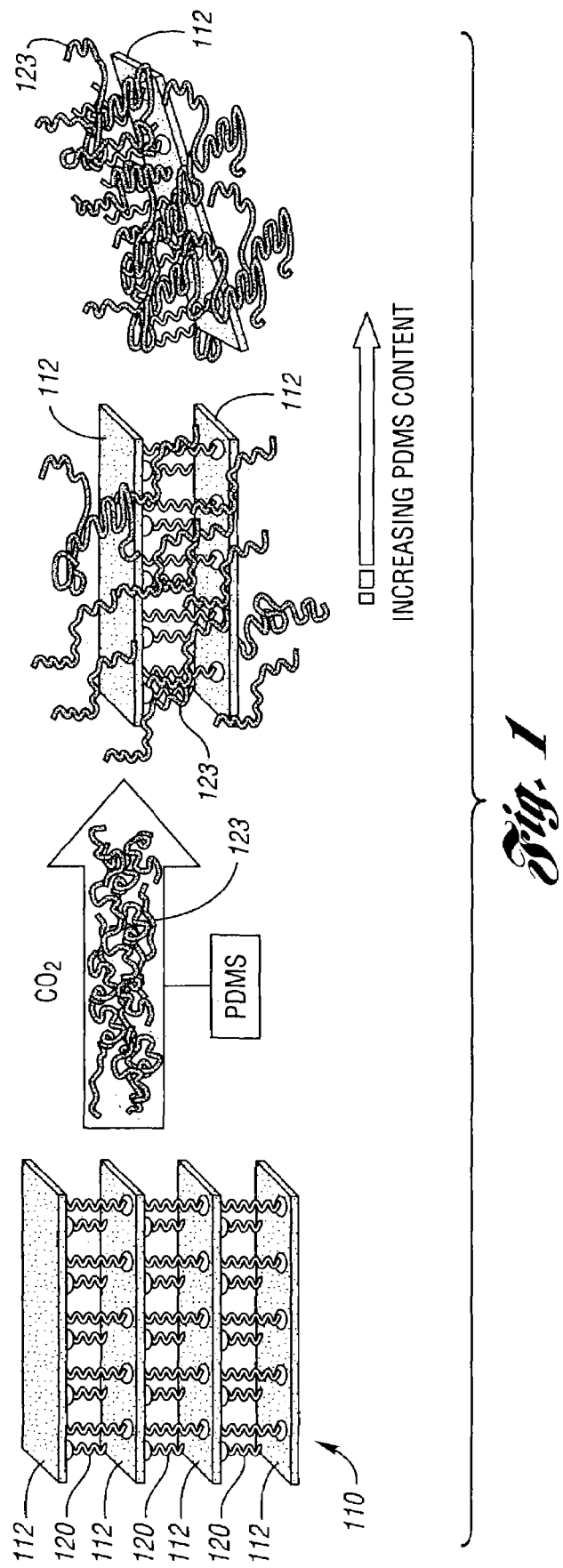
FIG. 1 is a perspective view of a schematic representation of diffusing a graphite structure by a coating agent solubilized in a supercritical fluid.

An example of the present invention comprises a method of delaminating a graphite structure with a coating agent solubilized in a supercritical fluid. The method comprises providing particles or platelets of the graphite structure and providing the coating agent solubilized in the supercritical fluid. In one embodiment, the graphite structure comprises natural graphite and synthetic graphite. Suitable graphite for use in the invention has one or more of the following properties: layered individual particles in powder form having a size between about 0.5 and 3.0 μm, a specific gravity of about 2 to 3, a melting temperature of about 3600 degrees Celsius, and perpendicular space between each other of about 3 to 4 angstroms.

As is known, if a substance is heated and is maintained above its critical temperature, it becomes impossible to liquefy it with pressure. When pressure is applied to this system, a single phase forms that exhibits unique physicochemical properties. This single phase is termed a supercritical fluid and is characterized by a critical temperature and critical pressure. Supercritical fluids have offered favorable means to achieve solvating properties which have gas and liquid characteristics without actually changing chemical structure. By proper control of pressure and temperature, a significant range of physicochemical properties (density, diffusivity, dielectric constants, viscosity) can be accessed without passing through a phase boundary, e.g., changing from gas to liquid form.

The supercritical fluid of the present invention is preferably carbon dioxide which may exist as a fluid having properties of both a liquid and a gas when above its critical temperature and critical pressure. Carbon dioxide at its supercritical conditions has both a gaseous property, being able to penetrate through many materials and a liquid property, being able to dissolve materials into their components. Although the supercritical fluid is preferably carbon dioxide, the supercritical fluid may comprise other suitable fluids such as methane, ethane, and ethylene or mixtures thereof.

A coating agent in accordance with the present invention comprises compounds which can be solubilized in the supercritical fluid to diffuse between the graphite layers or platelets. Generally, the coating agent may include polymers, oligomers, monomers, and oils or mixtures thereof soluble in the supercritical fluid. In one embodiment, the coating agent is poly-(dimethylsiloxane) ("PDMS") having a weight average molecular weight of preferably between about 30000 and 200000. Other suitable coating agents may be used such as poly-(tetrafluoroethylene-co-hexafluoropropylene), poly-(perfluoropropylene oxide), poly-(diethylsiloxane), poly-(dimethylsilicone), poly-(phenylmethylsilicone), perfluoroalkylpolyethers, chlorotrifluoroethylene, and bromotrifluoroethylene.

The graphite particles and the coating agent are preferably placed in a compartment of a high-pressurized vessel isolatable from the atmosphere. In this embodiment, the graphite particles comprise about 23 to 83 weight percent and the coating agent comprises about 77 to 17 weight percent of material placed in the vessel. The weight ratio of graphite particles to coating agent is preferably at least about 1:10. Then, the compartment is sealed off from the atmosphere. The compartment may be isolated by any conventional means.

When carbon dioxide is used, high-pressurized carbon dioxide is then introduced into the compartment and is pressurized in the vessel to above about 1,050 to 10,000 pounds per square inch gauge (psig), and preferably to above about 1100 psig. Then, heat is applied to the vessel to heat the vessel to a temperature above about 40 to 150 degrees Celsius, and preferably to above about 70 degrees Celsius. These conditions define a supercritical condition of carbon dioxide whereby the coating agent solubilizes in the supercritical carbon dioxide. However, other ranges may be used for other supercritical fluids without falling beyond the scope or spirit of the present invention. Pressurizing and heating the particles with the supercritical fluid may be accomplished by any conventional means.

When the coating agent solubilizes in the supercritical fluid, the coating agent diffuses between the graphite particles, defining contacted graphite particles. It is to be understood that the term "diffuses" mentioned above may be equated "expands" or "swells" with respect to the coating agent and the graphite particles. In this embodiment, the vessel is heated by any conventional heating jacket or electrical heating tape disposed about the vessel. Moreover, diffusing the coating agent between the graphite particles includes maintaining diffusion for between about 10 minutes to 24 hours at supercritical conditions and preferably 3 hours, to produce contacted graphite particles.

The method further comprises catastrophically depressurizing the contacted graphite particles to precipitate the coating agent from the supercritical fluid and to deposit the coating agent on the contacted graphite particles, defining delaminated graphite particles. During catastrophic depressurization, the supercritical fluid expands which mechanically intercalates the graphite layers and the coating agent precipitates from the supercritical fluid onto the layers. After catastrophic depressurization, the contacted graphite particles are exfoliated or intercalated such that the particles are substantially delaminated and disordered.

In this embodiment, depressurizing comprises immediately depressurizing the vessel down to a considerably lower pressure, preferably ambient pressure. This may be accomplished in a time period of between about 5 and 30 seconds, and preferably 15 seconds. In this embodiment, this is accomplished by depressurizing the contacted graphite at a rate of between about 0.1 and 5.0 milliliters per second, and preferably 3.0 milliliters per second. The pressure decrease may be accomplished by opening the compartment to the atmosphere. In this embodiment, as depressurizing occurs, heating is stopped, thus lowering the temperature of the particles. As immediate depressurization occurs, the graphite particles are delaminated or substantially singly dispersed apart from each other.

Although not wanting to be limited to any particular theory, it is believed that the low viscosity and high diffusivity of the supercritical fluid allows the coating agent solubilized therein to become disposed or intercalated between the layers of the graphite particles during supercritical conditions, providing an increase in interlayer spacing therebetween. It is further believed that, upon depressurization, the supercritical fluid disposed interstitially between the particles force the particles to exfoliate or delaminate from each other, and the coating agent previously solubilized in the supercritical fluid precipitates therefrom to deposit on the contacted graphite particles, preventing reformation of covalent bonds between the particles. That is, the coating agent precipitates from the supercritical fluid and attaches to the graphite. Thus, a substantially uniformly dispersed amount of delaminated graphite particles results.

Thereafter, the delaminated graphite particles may be prepared for use in several applications. For example, the delaminated graphite may be mixed or incorporated with a polymer to form a graphite-polymer nanocomposites having high surface area contact between the graphite particles and the polymer. The graphite-polymer nanocomposites may comprise between about 0.1 and 40 weight percent of graphite. Moreover, the graphite contained in the graphite-polymer nanocomposites has a relatively high surface area to weight ratio. The high surface area substantially enhances the polymer by an increase in interfacial interactions while having little added weight. It has been found that polymers reinforced with delaminated graphite provides substantially increased chemical, heat conductivity, fire retardancy, and mechanical properties along with lower manufacturing time and cost.

The polymer may be any suitable polymer, such as the following plastics: polyvinyl chloride (PVC), polyethylene terephthalate, polyacrylonitrite, high density polyethylene (HDPE), polyethylene terephthalate (PETE), polyethylene triphallate (PET), polycarbonate, polyolefins, polypropylene, polystyrene, low density polyethylene (LDPE), polybutylene terephthalate, ethylene-vinyl acetate, acrylic-styrene-acrylonitrile, melamine and urea formaldehyde, polyurethane, acrylonitrile-butadiene-styrene, phenolic, polybutylene, polyester, chlorinated polyvinyl chloride, polyphenylene oxide, epoxy resins, polyacrylics, polymethyl methacrylate, acetals, acrylics, amino resins cellulosics, polyamides, phenol formaldehyde, nylon, or polytetrafluroethylene.

Graphite-polymer nanocomposites such as those described above may be manufactured by disposing the delaminated graphite particles and the polymer into a mixer. The mixer may be any conventional mixer, extruder, injection molding machine known in the art which has been used to mix finely divided reinforcing particles with polymer to form a graphite-polymer nanocomposites.

FIG. 1 depicts a schematic representation of graphite particles 110 prior to diffusing coating agent in the supercritical fluid between the graphite particles and after diffusing coating agent in the supercritical fluid between the graphite particles. FIG. 1 shows layered particles 112 with affinity via covalent bonds 120 therebetween. After solubilizing in the supercritical fluid, the coating agents 123 diffuse between the layered particles 112. This may also be referred to as "swelling" or "expanding" the graphite structure with the supercritical fluid to intercalate the coating agent between the layered graphite particles. As shown, coating agent diffusion or swelling between the graphite particles increases, as coating agent concentration increases within the supercritical fluid.

Figure 2A:
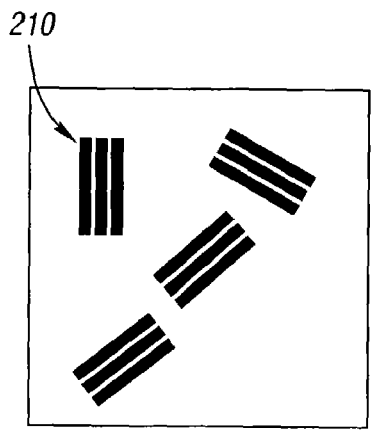
FIG. 2a is a cross-sectional view of a conceptual image of a graphite structure before processing with a coating agent in a supercritical fluid in accordance with one embodiment of the present invention.
Figure 2B:
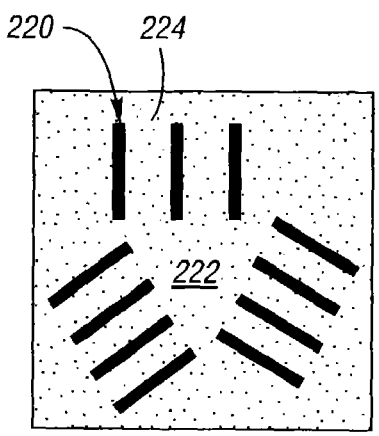
FIG. 2b is a cross-sectional view of a conceptual image of the graphite structure when diffused with a coating agent in a supercritical fluid.
Figure 2C:
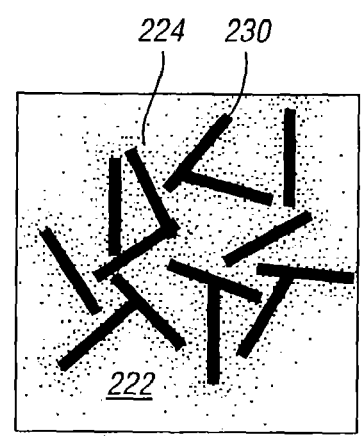
FIG. 2c is a cross-sectional view of a conceptual image of a graphite structure after depressurization from supercritical conditions.

FIGS. 2a–2c illustrate conceptual images of supercritical fluid processing of the graphite particles. FIG. 2a depicts layered graphite particles 210 before being diffused by the coating agent in the supercritical fluid. As mentioned, the layered graphite particles 210 are held together by covalent bonds. FIG. 2b illustrates contacted graphite particles 220 diffused by the coating agent 224 in the supercritical fluid 222 between the contacted graphite particles. FIG. 2c depicts the delaminated graphite particles 230 after catastrophic depressurization wherein the coating agent 224 is precipitated from the supercritical fluid 222 and deposited on the delaminated graphite particles 230.

Figure 3:
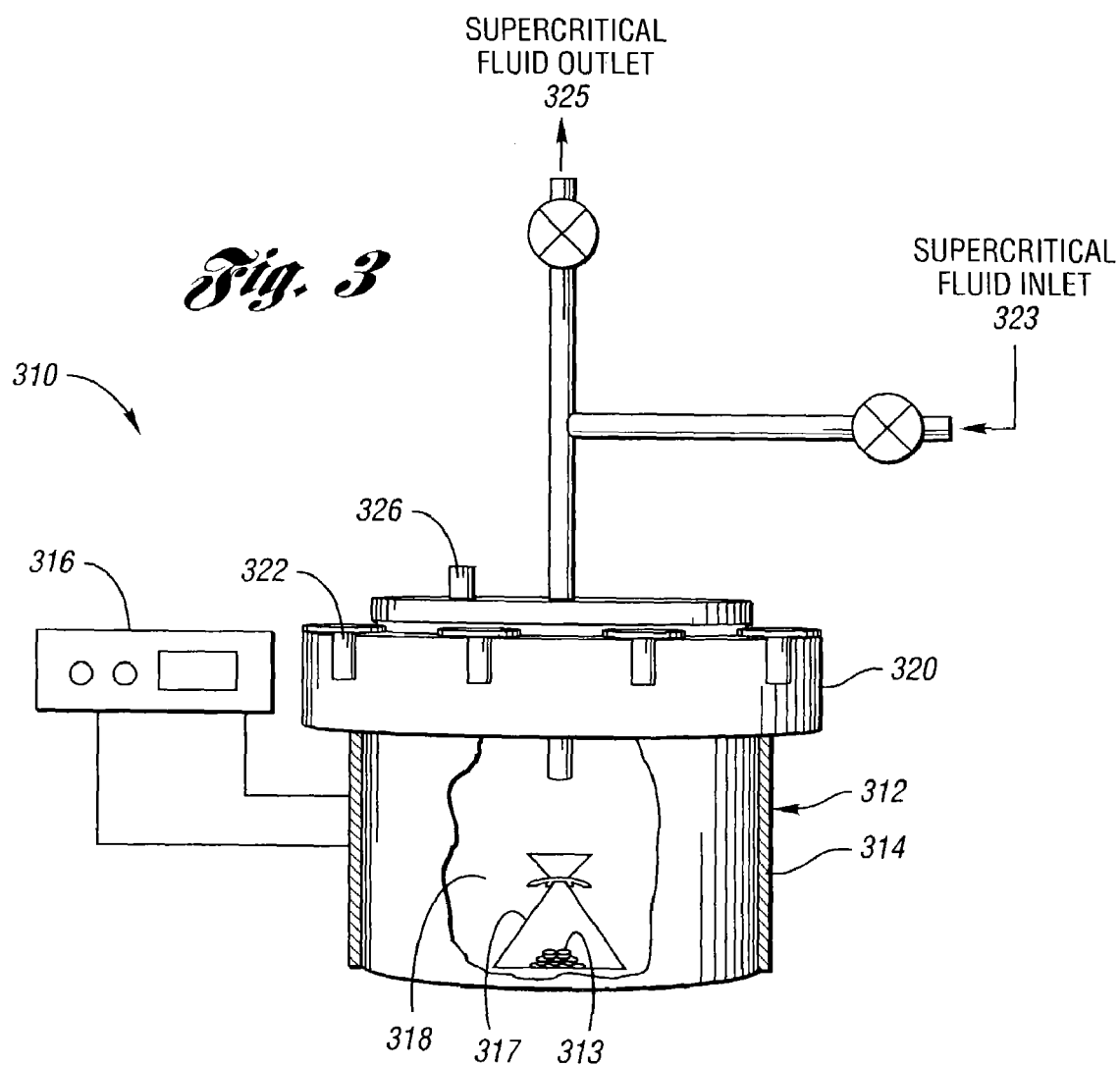
FIG. 3 is a side view of a system for delaminating a graphite structure in accordance with one embodiment of the present invention.

As shown in FIG. 3, the method mentioned above may be completed with the use of a number of apparatus. In this embodiment, a system 310 comprises a high-pressurized vessel 312 with a heating jacket 314 and temperature controller 316. The vessel 312 may be any conventional pressure vessel configured to receive graphite particles and a coating agent 313, preferably but not necessarily in a porous membrane 317, and supercritical fluid from any conventional source. The vessel 312 has the capability of maintaining high pressure and high temperature therein. In a preferred embodiment, the vessel 312 comprises an isolatable compartment 318 which receives graphite particles and the coating agent 313 and vents to the atmosphere by any suitable means such as a ball valve. The system 310 may further comprise a removable top 320 to allow placement of the graphite particles and the coating agent in the vessel 312. Thus, the removable top 320 may comprise a ring and security clamps 322 for securing the top to the vessel. The system 310 may further comprise piping means for a supercritical fluid inlet 323 and a supercritical fluid outlet 325. Moreover, the system may also include any suitable depressurization mechanism such as a blow-off valve 326 capable of releasing pressure from the vessel. The source of supercritical fluid may be any conventional fluid source such as a high-pressure gas cylinder containing the fluid of choice.

As mentioned above, a mixer may be used to mix the delaminated graphite particles with a polymer to form a graphite-polymer nanocomposites. The mixer (not shown) may be any conventional system, e.g., an extruder or injection molding machine, configured to receive delaminated graphite particles and a polymer into which the delaminated graphite particles are mixed and by means of which a graphite-polymer nanocomposites is produced.

Figure 4:
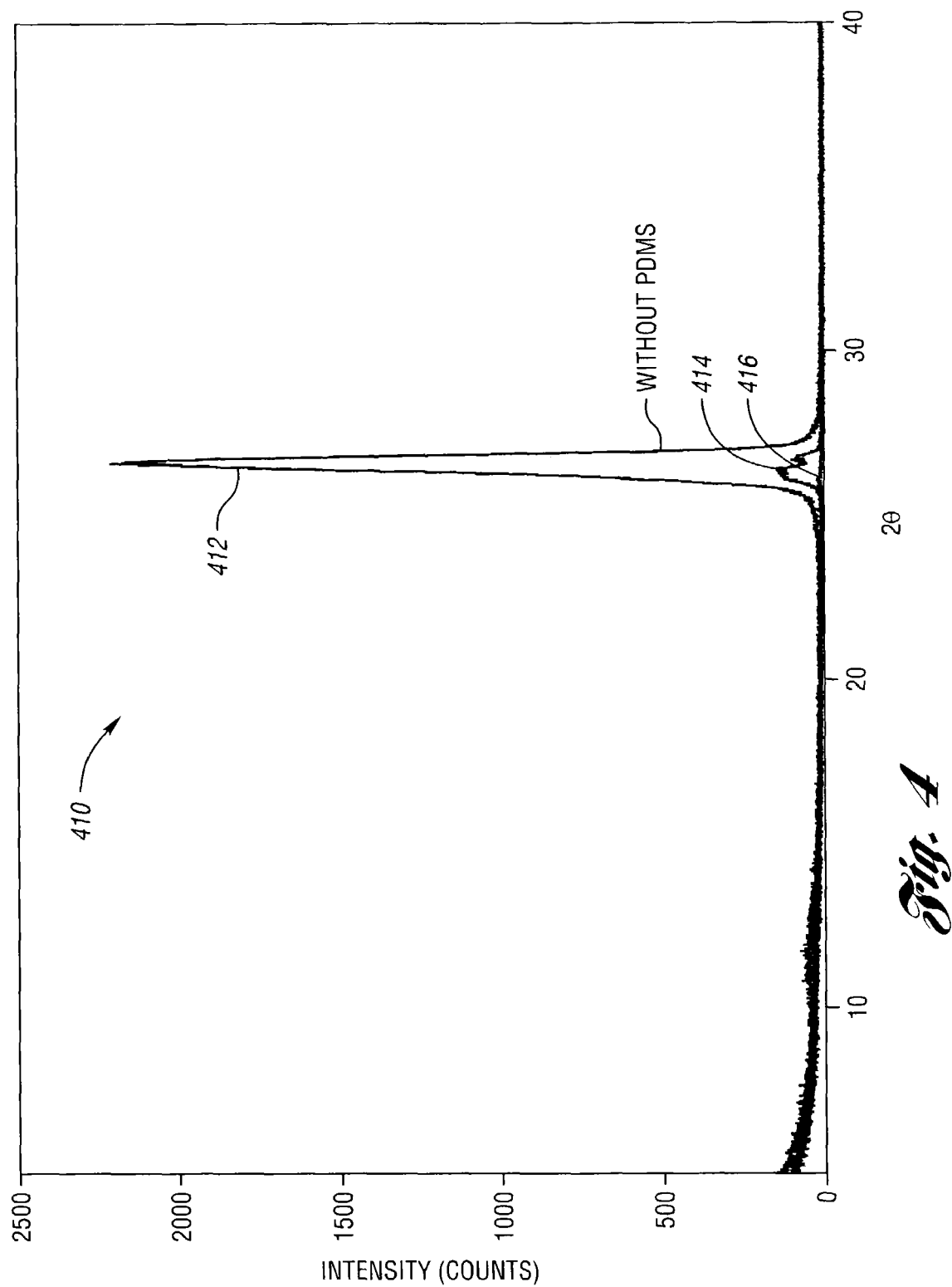
FIG. 4 is a plot of x-ray diffraction patterns of untreated and treated graphite structures.

FIG. 4 illustrates a plot of x-ray diffraction patterns 410 of treated and untreated depressurized graphite particle samples. As shown, pattern 412 of the untreated graphite without the coating agent (PDMS) provides a well-defined peak indicating a substantially ordered layered graphite structure. On the other hand, patterns 414 and 416 of delaminated graphite particles provide diffraction patterns which are more diffused and broadened, indicating a disordered morphology. Pattern 414 is a plot of the x-ray diffraction pattern of delaminated graphite particles with PDMS at a weight average molecular weight of 170300. Pattern 416 is an x-ray diffraction pattern of delaminated graphite particles with PDMS at a weight average molecular weight of 90200.

Figure 5:
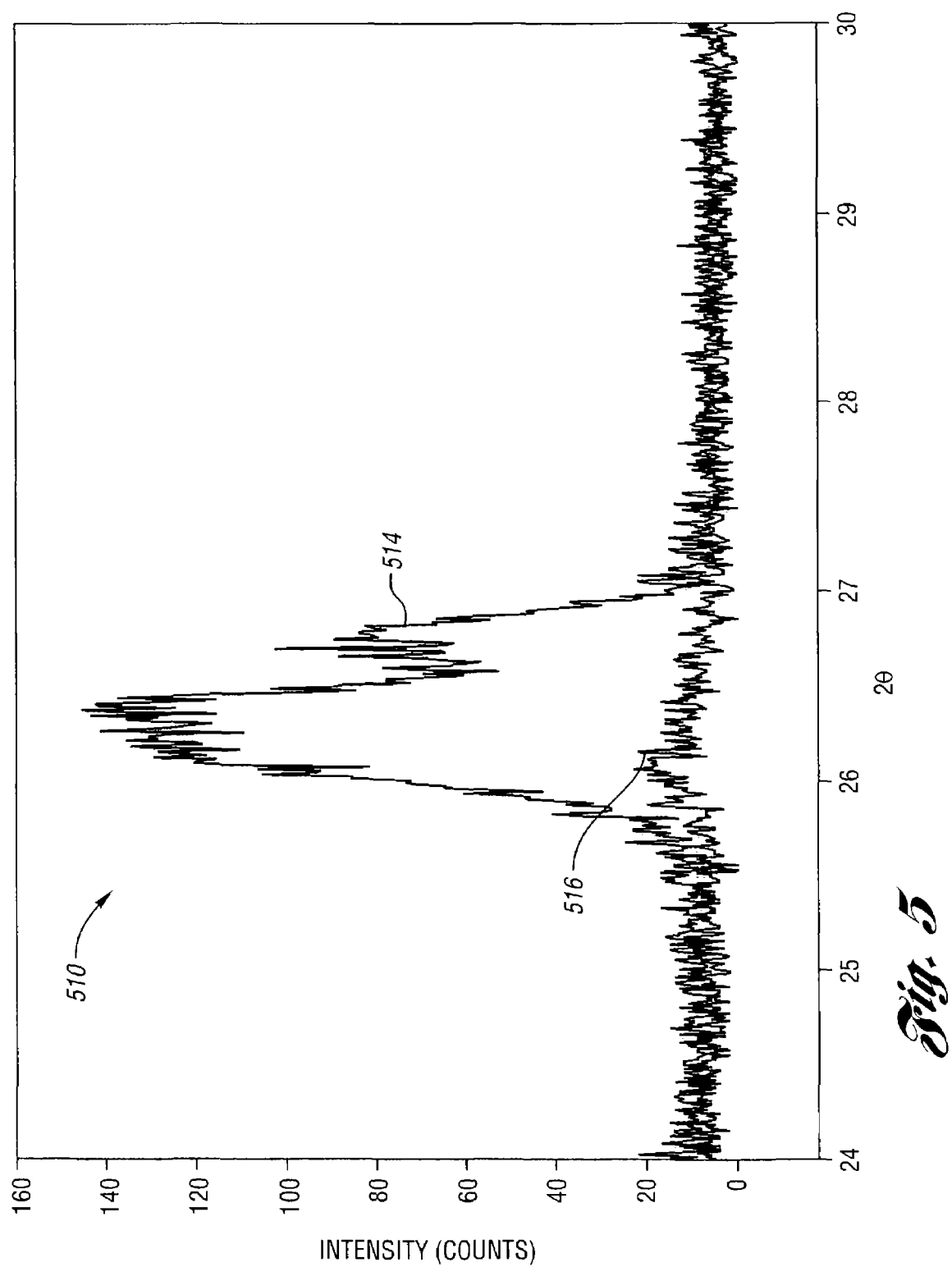
FIG. 5 is a plot of x-ray diffraction patterns of treated graphite structures with a supercritical fluid having a coating agent at different molecular weights.

FIG. 5 illustrates a plot of x-ray diffraction patterns 510 of treated graphite particle samples with supercritical fluid having differing weight average molecular weights of the coating agent. Pattern 514 is the x-ray diffraction pattern using PDMS at a weight average molecular weight of 90200 and pattern 516 is the x-ray diffraction pattern using PDMS at a weight average molecular weight of 170300. As shown, patterns 514 and 516 indicate that a PDMS molecular weight of 90200 provides a more disordered morphology than a PDMS weight average molecular weight of 170300.

In use, the graphite-polymer nanocomposites may be applied to form interior and exterior parts of a vehicle, e.g., interior trim panels, while requiring less weight than a typical vehicle part made by prior art technology. The graphite-polymer nanocomposites of the present invention allows parts to be relatively lighter in weight than previous parts, while providing the same or better mechanical properties. Moreover, the graphite-polymer nanocomposites containing the delaminated graphite particles experiences increased thermal conductivity of the polymer. The graphite-polymer nanocomposites also enhances fire retardation. Additionally, due to the dimensional features of the particles, barrier properties of polymers are also enhanced, providing increased resistance to permeation. This provides the capability of using such graphite-polymer nanocomposites as barrier products, e.g., fuel tanks. Furthermore, also due to the dimensional features of the particles, scratch resistant properties of polymers are enhanced, providing less manifestation of marks or scores placed on a product of the present invention.

Also, the delaminated graphite in accordance with the present invention may be used in other applications, in addition to polymer reinforcement. For example, the delaminated graphite may be used in catalyst supports and anisotropic colloidal particles, to name a few.

EXAMPLE

This example provides a method of delaminating graphite particles to be used in enhancing the properties of polymers. In this example, a sample of synthetic graphite in dry powdered form, high-pressurized carbon dioxide gas, and a sample of PDMS at 90200 weight average molecular weight were provided. The sample of the synthetic graphite comprised about 2.0 grams of 1 to 2 μm sized graphite. The graphite comprised layered particles having perpendicular spacing between each other of about 3 to 4 angstroms. The weight ratio of the graphite to PDMS was about 1:1. The samples of graphite and PDMS was placed in a glass vial. A porous membrane was used as a lid to close the glass vial. The glass vial containing the graphite and the PDMS was placed in a 100 milliliter high-pressure single compartment vessel. The vessel was capable of being isolated from the atmosphere by security clamps and ring. The vessel was in fluid communication with the high-pressure carbon dioxide by way of piping means and limited by valves. A heating jacket was disposed about the vessel to achieve and maintain the critical temperature of carbon dioxide.

When the vessel was isolated, the high-pressurized carbon dioxide was introduced therein and maintained at about 1100 psig. Then, the vessel was heated to about 70 degrees Celsius at which the supercritical conditions of carbon dioxide were achieved and maintained for about 3 hours, thereby solubilizing the PDMS in the carbon dioxide and diffusing between the graphite with the PDMS within the supercritical carbon dioxide.

After about 3 hours, the vessel was immediately depressurized at a rate of about 3 milliliters per second, thus catastrophically lowering the pressure within the vessel. This was accomplished by opening a connected blow-off valve of the vessel. As a result, delaminated graphite particles were formed having PDMS precipitated out and deposited about the delaminated graphite particles.

While various embodiments for carrying out the invention have been described in detail, those familiar with the art to which this invention relates will recognize various alternative designs and embodiments for practicing the invention as defined by the following claims.

The invention claimed is:

1. A method of delaminating a graphite structure, the method comprising:
   diffusing a coating agent in a supercritical fluid between layered particles of a graphite structure defining contacted graphite particles; and
   catastrophically depressurizing the supercritical fluid to form delaminated graphite particles.

2. The method of claim 1 further comprising mixing the delaminated graphite particles with a polymer to form a graphite-polymer nanocomposites.

3. The method of claim 1 wherein the supercritical fluid comprises carbon dioxide, ammonia, methane, ethane, or ethylene or a mixture thereof.

4. The method of claim 1 wherein the coating agent comprises a polymer, an oligomer, a monomer, or an oil or a mixture thereof.

5. The method of claim 1 wherein the coating agent is poly dimethylsiloxane having weight average molecular weights between about 30000 and 200000.

6. The method of claim 1 wherein the graphite structure comprises natural graphite and synthetic graphite.

7. The method of claim 1 wherein the synthetic graphite comprises expandable graphite.

8. The method of claim 1 wherein the graphite structure is in the form of powder with an average particle size of between about 0.5 and 3 μm.

9. The method of claim 1 wherein diffusing the supercritical fluid and the graphite structure is performed for a time between about 10 minutes to 24 hours.

10. The method of claim 1 wherein catastrophically depressurizing the contacted graphite particles is performed in between about 5 and 30 seconds.

11. The method of claim 1 wherein the layered particles are held together by covalent bonds and wherein catastrophically depressurizing the contacted graphite particles comprises exfoliating the contact layered particles and reducing reformation of the covalent bonds.

12. The method of claim 1 wherein catastrophically depressurizing the contacted graphite particles is performed at a predetermined rate of between about 0.1 and 5 milliliters per second.

13. The method of claim 1 the weight ratio of the graphite structure to the coating agent is at least about 1:10.

14. A method of preparing graphite-polymer nanocomposites, the method comprising:

diffusing layered graphite particles having covalent bonds with a coating agent solubilized in a supercritical fluid to intercalate the coating agent between the layered graphite particles defining contacted graphite particles;

catastrophically depressurizing the contacted graphite particles to exfoliate the contacted graphite particles and reduce reformation of the covalent bonds, the coating agent being precipitated from the supercritical fluid and deposited on the contacted graphite particles during depressurization, defining delaminated graphite particles; and mixing the delaminated graphite particles with a polymer to form graphite-polymer nanocomposites.

\* \* \* \* \*